(12) United States Patent
Kim

(10) Patent No.: US 12,441,253 B2
(45) Date of Patent: Oct. 14, 2025

(54) SPEAKER DEVICE, VEHICLE COMPRISING THE SAME, AND CONTROL METHOD OF VEHICLE

(71) Applicants: HYUNDAI MOTOR COMPANY, Seoul (KR); KIA CORPORATION, Seoul (KR)

(72) Inventor: Dongjin Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 237 days.

(21) Appl. No.: 18/206,378

(22) Filed: Jun. 6, 2023

(65) Prior Publication Data
US 2024/0034245 A1  Feb. 1, 2024

(30) Foreign Application Priority Data
Jul. 26, 2022  (KR) .......................... 10-2022-0092346

(51) Int. Cl.
*B60R 11/02* (2006.01)
*B60R 11/00* (2006.01)

(52) U.S. Cl.
CPC ... *B60R 11/0217* (2013.01); *B60R 2011/0007* (2013.01); *B60R 2011/0085* (2013.01); *B60R 2011/0092* (2013.01); *B60R 2011/0094* (2013.01)

(58) Field of Classification Search
CPC ......... B60R 11/0217; B60R 2011/0007; B60R 2011/0085; B60R 2011/0092; B60R 2011/0094; H04R 1/02; H04R 1/028; H04R 2499/13
See application file for complete search history.

(56) References Cited

U.S. PATENT DOCUMENTS

| | | | | |
|---|---|---|---|---|
| 4,953,223 A * | 8/1990 | Householder | ............ | H04R 1/26 381/387 |
| 8,068,618 B2 | 11/2011 | Vollmer | | |
| 8,189,849 B2 * | 5/2012 | Waddell | .................. | H04R 1/02 381/387 |
| 2010/0296686 A1 * | 11/2010 | Machii | .................. | H04R 1/345 381/387 |
| 2016/0068112 A1 * | 3/2016 | Price | ........................ | H04R 1/02 381/86 |
| 2016/0069100 A1 * | 3/2016 | Sonoda | .................. | H04R 1/023 135/96 |
| 2019/0353298 A1 * | 11/2019 | Okumura | ............. | H04R 1/1041 |

FOREIGN PATENT DOCUMENTS

| | | |
|---|---|---|
| JP | 2009-060198 A | 3/2009 |
| JP | 2011-176725 A | 9/2011 |
| JP | 2012-124876 A | 6/2012 |
| JP | 2022-044518 A | 3/2022 |
| KR | 20-1997-0011654 A | 5/1997 |
| KR | 10-1266027 B1 | 5/2013 |

* cited by examiner

*Primary Examiner* — Jason R Kurr
(74) *Attorney, Agent, or Firm* — Morgan, Lewis & Bockius LLP

(57) ABSTRACT

A vehicle includes: a speaker unit; a fixing member configured to fix the speaker unit to a vehicle body; a rotatable cover configured to be rotatable to a first state where the rotatable cover shields the speaker unit from an outside of the vehicle body, or to a second state where the speaker unit is exposed to the outside of the vehicle body; and a controller configured to control a rotation of the rotatable cover to switch the rotatable cover to the first state or the second state.

16 Claims, 10 Drawing Sheets

SPEAKER DEVICE, VEHICLE COMPRISING THE SAME, AND CONTROL METHOD OF VEHICLE

CROSS-REFERENCE TO RELATED APPLICATION

This application is based on and claims priority under 35 U.S.C. § 119 to Korean Patent Application No. 10-2022-0092346, filed on Jul. 26, 2022 in the Korean Intellectual Property Office, the disclosure of which is incorporated herein by reference.

TECHNICAL FIELD

The disclosure relates to a speaker device including a rotatable cover for shielding or exposing a speaker unit, a vehicle including the same, and a control method of the vehicle.

BACKGROUND

A vehicle refers to a machine that transports people, cargo, animal, etc., by driving on the road or rail. Such vehicles include three-wheeled or four-wheeled vehicles, two-wheeled vehicles such as motorcycles, heavy construction equipment, motor bicycles, bicycles, and railed vehicles such as trains, and the like.

In general, a vehicle is equipped with a plurality of speakers outputting various sounds.

Meanwhile, a speaker unit of a speaker device provided in a vehicle is exposed as an interior of vehicle body, causing vulnerability to foreign materials and marring an aesthetic appeal of vehicle.

SUMMARY

An aspect of the disclosure provides a speaker device that may expose a speaker unit externally only when required, a vehicle including the same, and a control method of the vehicle.

Additional aspects of the disclosure will be set forth in part in the description which follows and, in part, will be obvious from the description, or may be learned by practice of the disclosure.

According to an embodiment of the disclosure, there is provided a speaker device, including: a speaker unit; a fixing member configured to fix the speaker unit to an object; a rotatable cover configured to be rotatable to a first state where the rotatable cover shields the speaker unit from an outside of the object, or to a second state where the speaker unit is exposed to the outside of the object; and a controller configured to control a rotation of the rotatable cover to switch the rotatable cover to the first state or the second state.

Also, the rotatable cover may have a spherical shell shape, and include: a slit configured to prevent the rotatable cover from colliding with the fixing member while the rotatable cover rotates from the first state to the second state; and an opening configured to expose the speaker unit to the outside of the object in the second state.

Also, the rotatable cover may have a hemispherical surface exposed to the outside of the object in the first state.

Also, the controller may be configured to switch the rotatable cover to the second state based on a music playback mode being on, and switch the rotatable cover to the first state based on the music playback mode being off.

Also, the speaker device may further include a light emitter configured to emit light towards the rotatable cover.

Also, the light emitter may be on the fixing member.

Also, the rotatable cover may be configured to entirely expose the speaker unit to the outside of the object in the second state, and partially expose the speaker unit to the outside of the object in a third state, the controller may be configured to control the rotation of the rotatable cover to switch the rotatable cover to the first state, the second state or the third state, and the rotatable cover may include: a slit configured to prevent the rotatable cover from colliding with the fixing member while the rotatable cover rotates from the first state to the second state or the third state; a first opening configured to entirely expose the speaker unit to the outside of the object in the second state; and a second opening configured to partially expose the speaker unit to the outside of the object in the third state.

Also, a size of the first opening may be larger than a size of the second opening.

Also, the controller may be configured to switch the rotatable cover to the second state in a music playback mode, switch the rotatable cover to the third state in a navigation voice playback mode, and switch the rotatable cover to the first state in other modes.

According to an embodiment of the disclosure, there is provided a vehicle, including: a speaker unit; a fixing member configured to fix the speaker unit to a vehicle body; a rotatable cover configured to be rotatable to a first state where the rotatable cover shields the speaker unit from an outside of the vehicle body, or to a second state where the speaker unit is exposed to the outside of the vehicle body; and a controller configured to control a rotation of the rotatable cover to switch the rotatable cover to the first state or the second state.

Also, the rotatable cover may have a spherical shell shape, and include: a slit configured to prevent the rotatable cover from colliding with the fixing member while the rotatable cover rotates from the first state to the second state; and an opening configured to expose the speaker unit to the outside of the vehicle body in the second state.

Also, the rotatable cover may have a hemispherical surface exposed to the outside of the vehicle body in the first state.

Also, the controller may be configured to switch the rotatable cover to the second state based on a music playback mode being on, and switch the rotatable cover to the first state based on the music playback mode being off.

Also, the vehicle may further include a light emitter configured to emit light towards the rotatable cover.

Also, the light emitter may be on the fixing member.

Also, the rotatable cover may be configured to entirely expose the speaker unit to the outside of the vehicle body in the second state, and partially expose the speaker unit to the outside of the vehicle body in a third state, the controller may be configured to control the rotation of the rotatable cover to switch the rotatable cover to the first state, the second state or the third state, and the rotatable cover may include: a slit configured to prevent the rotatable cover from colliding with the fixing member while the rotatable cover rotates from the first state to the second state or the third state; a first opening configured to entirely expose the speaker unit to the outside of the vehicle body in the second state; and a second opening configured to partially expose the speaker unit to the outside of the vehicle body in the third state.

Also, a size of the first opening may be larger than a size the second opening.

Also, the controller may be configured to switch the rotatable cover to the second state in a music playback mode, switch the rotatable cover to the third state in a navigation voice playback mode, and switch the rotatable cover to the first state in other modes.

According to an embodiment of the disclosure, there is provided a method of controlling a vehicle including a speaker unit, a fixing member configured to fix the speaker unit to a vehicle body, and a rotatable cover having a spherical shell shape, the method including: controlling a rotation of the rotatable cover so that the rotatable cover is switched to one of a first state where the rotatable cover shields the speaker unit from an outside of the vehicle body, or a second state where the speaker unit is exposed to the outside of the vehicle body.

Also, the controlling of the rotation of the rotatable cover may include switching the rotatable cover to the second state in a music playback mode, and switching to the first state in other modes.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
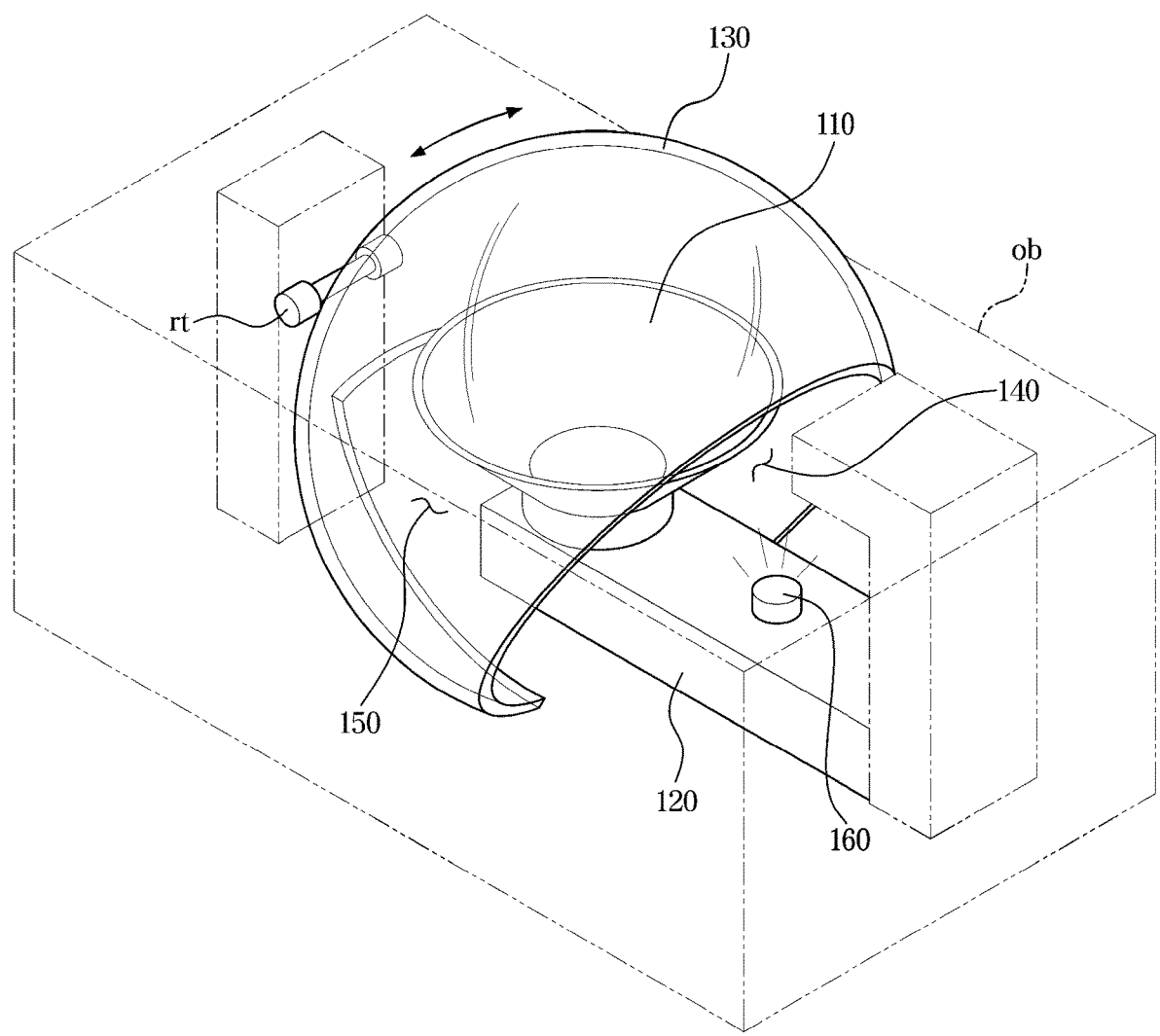
FIG. 1 is a perspective view illustrating a speaker device when a rotatable cover is in a first state according to an embodiment of the present disclosure.

Advantages and features of embodiments, and methods of achieving the same will be clearly understood with reference to the accompanying drawings and the following detailed embodiments. However, the present inventive concept is not limited to embodiments described herein, but may be implemented in various different forms. Embodiments are provided in order to explain the present inventive concept for those skilled in the art. The scope of the present inventive concept is defined by the appended claims.

The terms used herein will be briefly described and embodiments will be described in detail.

Although the terms used herein are selected from among general terms that are currently and widely used in consideration of functions in embodiments, these may be changed according to intentions or customs of those skilled in the art or the advent of new technology. In addition, in a specific case, some terms may be arbitrary selected by applicants. In this case, meanings thereof will be described in a corresponding description of embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component unless otherwise defined. Moreover, terms described in the specification such as "part" and "controller" refer to a unit of processing at least one function or operation, and may be implemented by software, a hardware component such as a field-programmable gate array (FPGA) or an application-specific integrated circuit (ASIC), or a combination of software and hardware. However, the term "part" is not limited to software or hardware. "Part" may be configured in a recording medium that may be addressed or may be configured to be reproduced on at least one processor. Therefore, examples of the term "part" includes software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Reference numerals used for method steps are just used for convenience of explanation, but not to limit an order of the steps. Thus, unless the context clearly dictates otherwise, the written order may be practiced otherwise.

Hereinafter, embodiments of a speaker device, a vehicle including the same, and a control method of the vehicle are described in detail with reference to the accompanying drawings. In addition, parts irrelevant to description are omitted in the drawings in order to clearly explain embodiments. In the accompanying drawings, parts that are identical or equivalent to each other will be assisted the same reference numerals, and in the following description of the embodiments, details of redundant descriptions thereof will be omitted.

Figure 2:
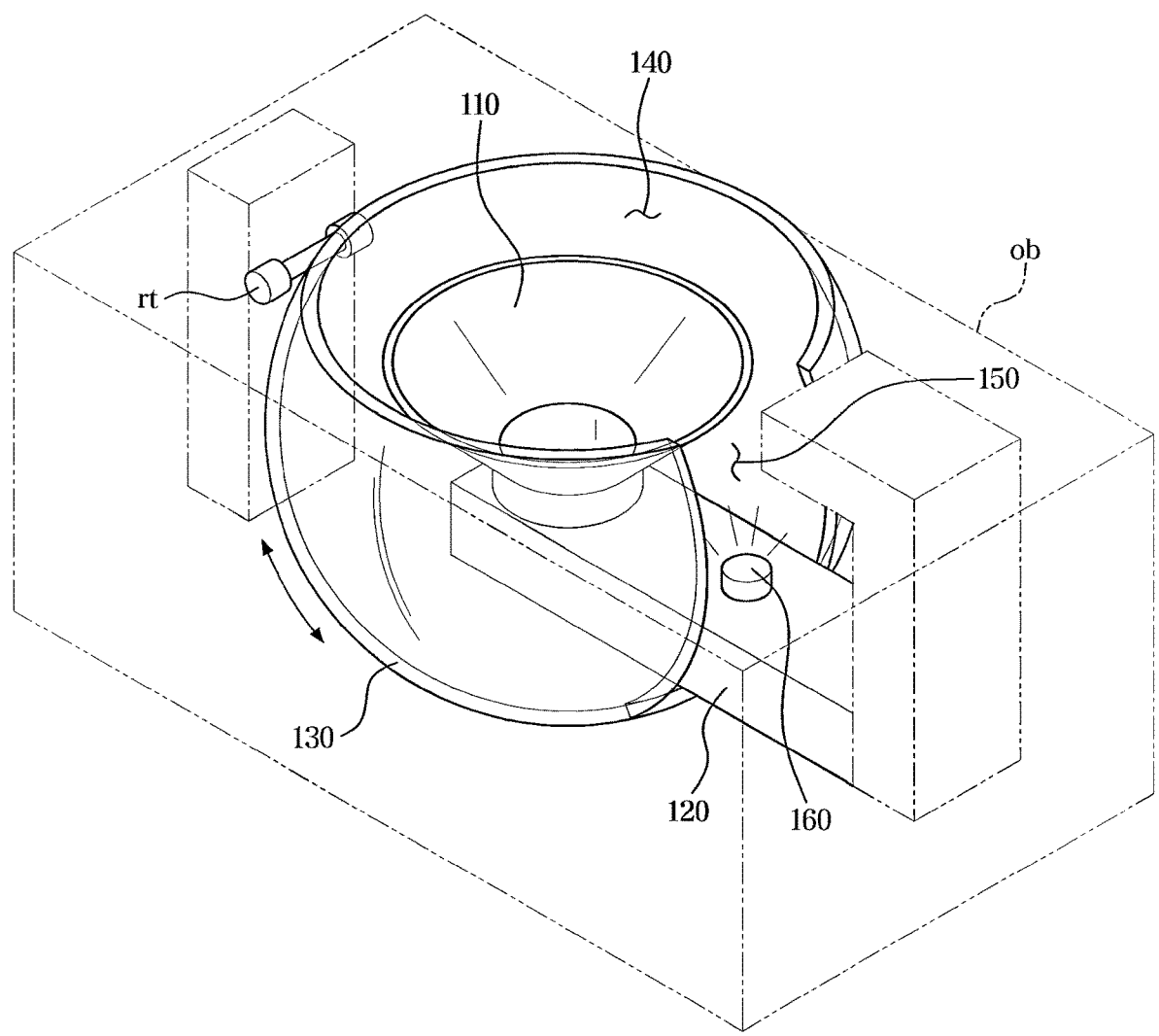
FIG. 2 is a perspective view illustrating a speaker device when a rotatable cover is in a second state according to an embodiment of the present disclosure.

FIG. 1 is a perspective view illustrating a speaker device when a rotatable cover is in a first state according to an embodiment of the present disclosure. FIG. 2 is a perspective view illustrating a speaker device when a rotatable cover is in a second state according to an embodiment of the present disclosure.

Referring to FIGS. 1 and 2, a speaker device 10 according to an embodiment may include a speaker unit 110, a fixing member 120 fixing the speaker unit 110 to an object ob, a rotatable cover 130 covering the speaker unit 110, and a light emitter 160.

The speaker unit 110 may output a sound based on an electrical signal.

The speaker unit 110 may be classified into a cone type, a flat panel type, a dome type, a horn type, a ribbon type, or a condenser type depending on its structure, and may also be classified into a woofer or a tweeter, and the like, depending on its type.

According to various embodiments, the speaker unit 110 may include a frame, a diaphragm installed inside the frame, a magnetic circuit part installed in front of the diaphragm to vibrate the diaphragm, a supporting member supporting the magnetic circuit part, a bobbin installed in a center of the diaphragm and wound with a voice coil on an outer surface of the magnetic circuit part, and a damper supporting the bobbin. When an electrical signal is applied to the magnetic circuit part of the speaker unit 110, the bobbin vibrates, and the diaphragm vibrates due to the vibration of the bobbin, thereby outputting a sound corresponding to the electrical signal.

However, a configuration and a sound output method of the speaker unit 110 may vary depending on a type of the speaker unit 110.

In the present specification, a direction to which the speaker unit 110 outputs a sound is defined as a front of the speaker unit 110, and an opposite direction is defined as a rear of the speaker unit 110.

The fixing member 120 may fix the speaker unit 110 to the object ob.

The fixing member 120 may be implemented in various forms capable of connecting the speaker unit 110 and the object ob.

For example, the fixing member 120 may be implemented in a bar or rod shape, without being limited thereto.

The fixing member 120 may be implemented in any shape, as long as it can connect the speaker unit 110 and the object ob.

The object ob may correspond to an enclosure of the speaker device 10, without being limited thereto. For example, when the speaker device 10 is provided in a vehicle 20, the object ob may correspond to a vehicle body ob of the vehicle 20.

A portion of the rotatable cover 130 may be shielded by the object ob from an outside. When the speaker device 10 is installed in the vehicle 20, the portion of the rotatable cover 130 may be shielded by the vehicle body ob.

According to various embodiments, the fixing member 120 may connect a rear portion of the speaker unit 110 and an internal portion of the object ob. That is, the fixing member 120 may fix the rear portion of the speaker unit 110 to the internal portion of the object ob. When the speaker device 10 is installed in the vehicle 20, the fixing member 120 may fix the rear portion of the speaker unit 110 to an internal portion of the vehicle body ob.

The fixing member 120 may include a housing that covers at least one transmission line for transmitting an electrical signal to drive the speaker unit 110.

For example, the fixing member 120 may include a driving circuit connected to the magnetic circuit part.

Through the transmission line provided on the fixing member 120, the electrical signal transmitted from the object ob may be transmitted to the speaker unit 110, and thus the speaker unit 110 may output a sound. When the speaker device 10 is installed in the vehicle 20, an electrical signal transmitted from the vehicle 20 may be transmitted to the speaker unit 110 through the transmission line provided on the fixing member 120, and thus the speaker unit 110 may output a sound.

The rotatable cover 130 is rotatable to a state (hereinafter, a 'first state') where the rotatable cover 130 shields the speaker unit 110 from an outside of the object ob, or to a state (hereinafter, a 'second state') where the speaker unit 110 is exposed to the outside of the object ob.

To this end, a rotation axis of the rotatable cover 130 may be fixed to the object ob.

The rotatable cover 130 may have a spherical shell shape and include an opening 140 and a slit 150.

The slit 150 may function as a passage for preventing the rotatable cover 130 from colliding with the fixing member 120, while the rotatable cover 130 rotates from the first state to the second state.

For example, the slit 150 may be formed by partially cutting a spherical surface of the rotatable cover 130.

The slit 150 may be formed by partially cutting the spherical surface in a rotational direction of the rotatable cover 130, and may have a larger width than the fixing member 120.

Accordingly, while the rotatable cover 130 rotates from the first state to the second state, the fixing member 120 may not collide with the rotatable cover 130.

The opening 140 may expose the speaker unit 110 to the outside of the object ob in the second state. When the speaker device 10 is installed in the vehicle 20, the opening 140 may expose the speaker unit 110 to the outside of the vehicle body in the second state.

A state where the speaker unit 110 is exposed to the outside of the object ob refers to a state where a user is capable of seeing the speaker unit 110. A state where the speaker unit 110 is exposed to the outside of the vehicle body ob refers to a state where an occupant of the vehicle 20 is capable of seeing the speaker unit 110.

The opening 140 may be formed by cutting the spherical shell shape by a single plane. That is, the opening 140 in a circular shape may be formed when a spherical cap is cut off from the spherical shell shape.

A diameter of a cross section obtained by slicing the spherical shell form by the single plane may be larger than that of the speaker unit 110. That is, a diameter of the opening 140 may be larger than that of the speaker unit 110.

The opening 140 and the slit 150 may be connected to each other. Accordingly, the rotatable cover 130 may expose the speaker unit 110 to the outside of the object ob, or shield the speaker unit 110 from the outside of the object ob without colliding with the fixing member 120.

According to various embodiments, the rotatable cover 130 may include a hemispherical surface.

The rotatable cover 130 may be made of various materials to improve an aesthetic appeal of the rotatable cover 130. For example, the rotatable cover 130 may be made of various materials such as glass, crystal, acrylic, and the like.

Referring to FIG. 1, when the rotatable cover 130 is in the first state, the hemispherical surface of the rotatable cover 130 may be exposed to the outside of the object ob. Meanwhile, when the rotatable cover 130 is in the first state, the speaker unit 110 may be shielded from the outside of the object ob by the hemispherical surface of the rotatable cover 130.

According to the disclosure, when the rotatable cover 130 is switched to the first state, only the hemispherical surface of the rotatable cover 130 is exposed to the outside of the object ob, thereby improving the aesthetic appeal of the speaker device 10.

Also, according to the disclosure, when the rotatable cover 130 is switched to the first state, foreign materials such as dirt in the air may be prevented from entering into the speaker unit 110.

Referring to FIG. 2, when the rotatable cover 130 is in the second state, the opening 140 of the rotatable cover 130 is exposed to the outside of the object ob, thereby exposing the speaker unit 110 to the outside of the object ob. Meanwhile, when the rotatable cover 130 is in the second state, the hemispherical surface of the rotatable cover 130 may be located inside the object ob.

According to various embodiments, the speaker device 10 may include a driver 180 for rotating the rotatable cover 130. The driver 180 may rotate the rotatable cover 130 from the first state to the second state or from the second state to the first state based on a control signal of a controller.

For example, the driver 180 may include a roller rt, which is provided inside the object ob and contacts the rotatable cover 130, and a driving motor for rotating the roller rt.

However, a type of the driver 180 is not limited thereto, and any type of the driver 180 may be used, as long as it can rotate the rotatable cover 130 based on a rotational axis.

The light emitter 160 may emit light towards the rotatable cover 130.

The light emitter 160 may include at least one light emitting diode (LED) emitting light of various colors.

According to various embodiments, the light emitter 160 may be provided on the fixing member 120, but a position thereof is not limited thereto.

For example, the light emitter 160 may be installed on any position capable of emitting light towards the rotatable cover 130.

According to the disclosure, light of various colors is emitted to the rotatable cover 130, thereby improving an aesthetic appeal of the speaker device 10.

Figure 3:
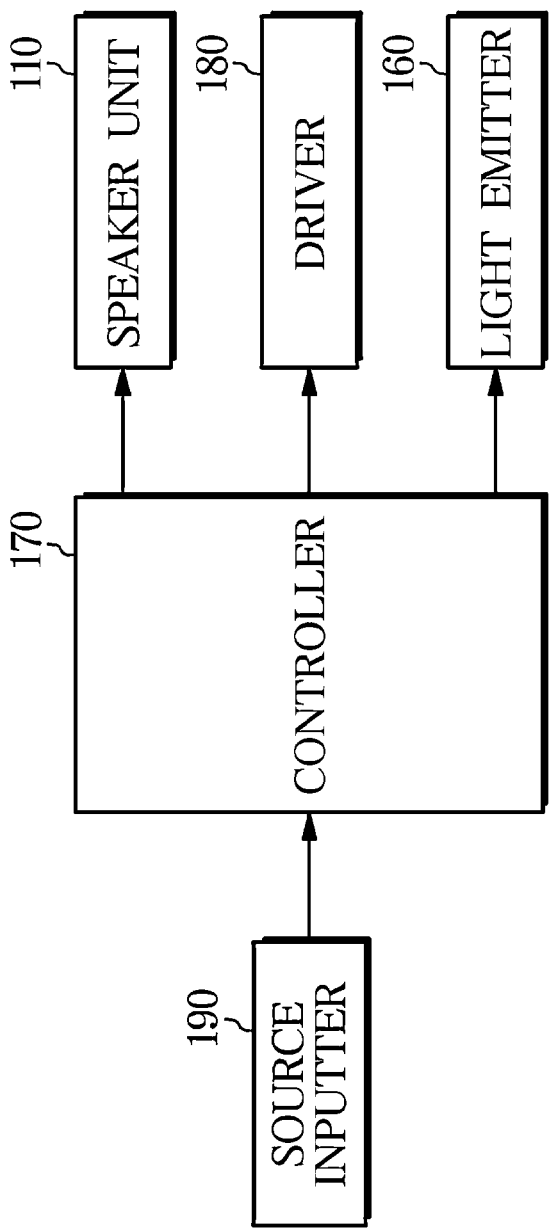
FIG. 3 illustrates a configuration of a speaker device according to an embodiment of the present disclosure.
Figure 4:
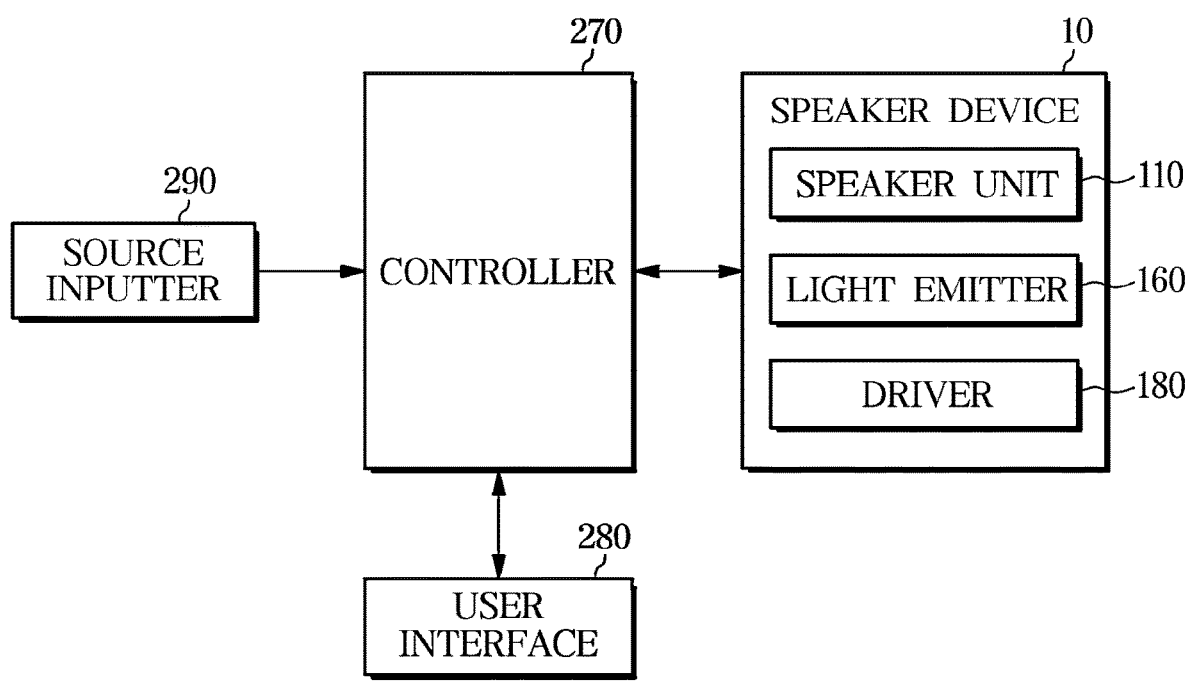
FIG. 4 illustrates a configuration of a vehicle according to an embodiment of the present disclosure.

FIG. 3 illustrates a configuration of a speaker device according to an embodiment of the present disclosure. FIG. 4 illustrates a configuration of a vehicle according to an embodiment of the present disclosure.

Referring to FIG. 3, the speaker device 10 may include a source inputter 190 generating an electrical signal corresponding to a sound signal, a controller 170 controlling various operations of the speaker device 10, the speaker unit 110 outputting a sound corresponding to the electrical signal, the driver 180 rotating the rotatable cover 130, and the light emitter 160.

The source inputter 190 may receive a source signal input from a source device (e.g. a computer device, a game console, a set-top box, a USB, an antenna, an audio, video, navigation (AVN) device, etc.). According to various embodiments, the source inputter 190 may include a wireless communication module (e.g. a Bluetooth module) receiving a wireless source signal.

The source inputter 190 may include various constituent components for processing the source signal received from the source device.

For example, the source inputter 190 may include a digital-to-digital converter for changing a standard of a source signal, a digital-to-analog converter for changing a source signal into an analog signal, and/or an amplifier for amplifying an analog signal.

According to various embodiments, the controller 170 may process the source signal received by the source inputter 190.

The controller 170 may include at least one memory storing a program for performing the aforementioned operations and operations described below and various data, and at least one processor for implementing a stored program.

The memory may include a volatile memory such as a static random access memory (S-RAM) and dynamic random access memory (D-RAM), and a non-volatile memory such as a read only memory (ROM), an erasable programmable read only memory (EPROM), and the like. The memory may include a single memory device or a plurality of memory devices. At least one processor may execute a program stored in each memory.

For example, the controller 170 may transmit a sound signal, generated based on a source signal (or a processed analog signal) input through the source inputter 190, to the speaker unit 110, and the speaker unit 110 may output a sound corresponding to the sound signal.

The controller 170 may transmit the sound signal to the speaker unit 110 using a transmission line included in the fixing member 120.

As another example, the controller 170 may control a rotation of the rotatable cover 130.

In an embodiment, the controller 170 may control the rotation of the rotatable cover 130 so that the rotatable cover 130 is switched to a first state or a second state based on an operation mode of the speaker device 10.

For example, the controller 170 may control the driver 180 so that the rotatable cover 130 is switched to the second state from the first state, based on receiving a user input for turning on the speaker device 10.

Also, the controller 170 may control the driver 180 so that the rotatable cover 130 is switched to the first state from the second state, based on receiving a user input for turning off the speaker device 10.

According to various embodiments, the controller 170 may control the driver 180 so that the rotatable cover 130 is switched to the second state from the first state, based on receiving the source signal through the source inputter 190.

Also, the controller 170 may control the driver 180 so that the rotatable cover 130 is switched to the first state from the second state, based on not receiving the source signal through the source inputter 190.

According to various embodiments, when the speaker device 10 corresponds to a Bluetooth speaker, the controller 170 may control the driver 180 so that the rotatable cover 130 is switched to the second state from the first state, based on establishment of Bluetooth communication between the speaker device 10 and a terminal (e.g. a smartphone).

Also, the controller 170 may control the driver 180 so that the rotatable cover 130 is switched to the first state from the second state, based on disconnection of Bluetooth communication between the speaker device 10 and a terminal (e.g. a smartphone).

That is, the controller 170 may switch the rotatable cover 130 to the second state based on the speaker device 10 operating in a music playback mode, and switch the rotatable cover 130 to the first state in other modes.

The music playback mode refers to a mode for the speaker device 10 to output a sound.

Accordingly, in the disclosure, the music playback mode may correspond to a state in which the speaker device 10 is turned on, a state in which a source signal is input from the source inputter 190, and/or a state in which a Bluetooth terminal is connected, and the like.

According to various embodiments, the controller 170 may control the light emitter 160 to emit light, based on a preset condition being satisfied.

For example, when the speaker device 10 is turned on, the controller 170 may control the light emitter 160 to emit light and maintain the first state of the rotatable cover 130.

Referring to FIG. 4, the speaker device 10 may be installed in the vehicle 20 according to an embodiment.

The vehicle 20 according to an embodiment may include a source inputter 290 generating an electrical signal corresponding to a sound signal, a controller 270 controlling various operations of the vehicle 20, a user interface 280 and the speaker device 10.

The controller 270 may include at least one electronic control unit (ECU) provided in the vehicle 20, and according to embodiments, may include the controller 170 of the speaker device 10.

The controller 270 may include at least one memory storing a program for performing the aforementioned operations and operations described below and various data, and at least one processor for implementing a stored program.

The memory may include a volatile memory such as a static random access memory (S-RAM) and dynamic random access memory (D-RAM), and a non-volatile memory such as a read only memory (ROM), an erasable programmable read only memory (EPROM), and the like. The memory may include a single memory device or a plurality of memory devices. At least one processor may execute a program stored in each memory.

For example, the controller 270 may include a head unit of the vehicle 20. The head unit may process and output an audio signal and a video signal, and perform a navigation function. Accordingly, the head unit may be referred to as an AVN device.

The source inputter 290 may receive a source signal input from a source device (e.g. a computer device, a game console, a set-top box, a USB, an antenna, an AVN device, etc.). According to various embodiments, the source inputter 290 may include a wireless communication module (e.g. a Bluetooth module) receiving a wireless source signal.

As described above, the source inputter 290 may include various constituent components for processing the source signal received from the source device.

The user interface 280 may include a display for displaying various information related to functions of the vehicle 20, and an inputter for receiving a user input.

The display may provide a user interface for interaction between an occupant and the vehicle 20. For example, the display may include a liquid crystal display (LCD) panel and/or a light emitting diode (LED).

The display may provide a user with various information based on a control signal of the controller 270. For example, the display may be provided on a center fascia located in a center of a dashboard of the vehicle 20, and the display may be a constituent component of the head unit, or a constituent component of a navigation device provided separately from the head unit.

The inputter may receive various user inputs for setting a function of the vehicle 20. For example, the inputter may be provided as a tact switch, joystick, push switch, slide switch, toggle switch, micro switch, or touchscreen.

According to various embodiments, the inputter may include a microphone for receiving a voice input from a user.

The user interface 280 may receive a user input for switching the speaker device 10 to the music playback mode.

For example, the user interface 280 may receive an execution command for the music playback mode from a user.

For instance, the controller 270 may activate the music playback mode, based on a button for turning on an audio function being pressed.

The music playback mode may include a universal serial bus (USB) music playback mode, a radio playback mode, and/or a wireless music playback mode, etc.

The USB music playback mode refers to a mode for playing music stored in a USB connected to a USB port provided in the vehicle 20, and the radio playback mode refers to a mode for playing radio. The wireless music playback mode refers to a mode for playing music received through a wireless communication module (e.g. a Bluetooth module) of the vehicle 20.

According to various embodiments, when a navigation function of the vehicle 20 is operated in a state where the speaker device 10 is not switched to the music playback mode, the speaker device 10 may be operated in a navigation voice playback mode.

That is, when the navigation function of the vehicle 20 is operated in a state where no command for activating the music playback mode is received, the speaker device 10 may be operated in the navigation voice playback mode.

Figure 5:
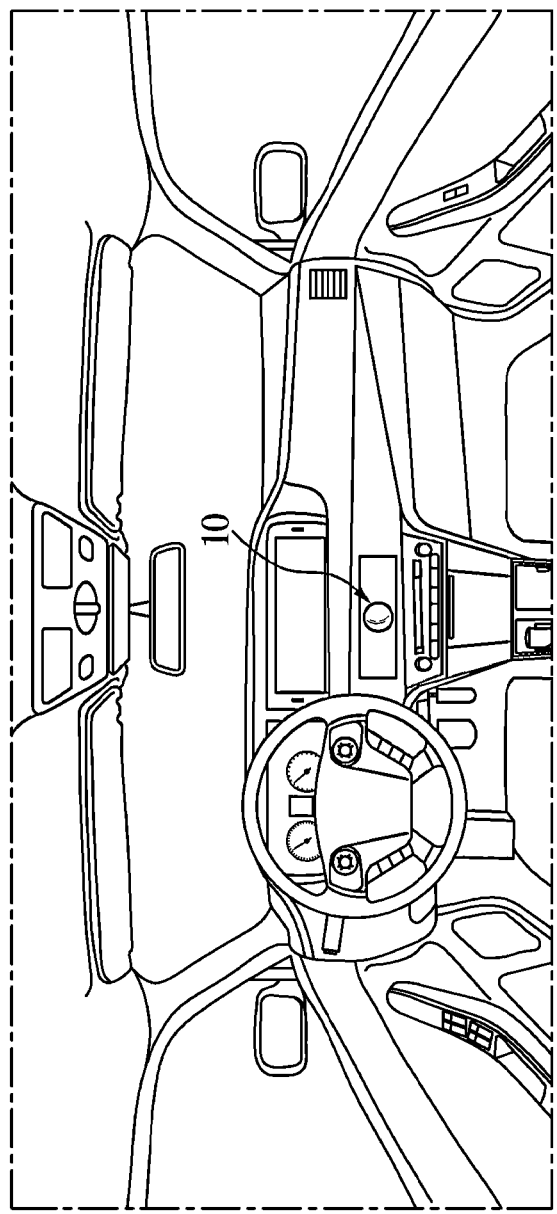
FIG. 5 illustrates an example where a speaker device is provided in a vehicle according to an embodiment of the present disclosure.

FIG. 5 illustrates an example where a speaker device is provided in a vehicle according to an embodiment of the present disclosure.

Referring to FIG. 5, when the speaker device 10 is installed in the vehicle 20, the speaker device 10 may be provided on a center fascia which is a center area of a dashboard of the vehicle 20, without being limited thereto.

The speaker unit 110 may be fixed to a vehicle body ob through the fixing member 120, and the rotatable cover 130 may rotate to a first state where the rotatable cover 130 shields the speaker unit 110 from an outside of the vehicle body ob, or to a second state where the speaker unit 110 is exposed to the outside of the vehicle body ob.

When the rotatable cover 130 is in the first state, a hemispherical surface of the rotatable cover 130 may be exposed to the outside of the vehicle body ob. Meanwhile, when the rotatable cover 130 is in the first state, the speaker unit 110 may be shielded from the outside of the vehicle body ob by the hemispherical surface of the rotatable cover 130.

When the rotatable cover 130 is in the second state, the opening 140 of the rotatable cover 130 is exposed to the outside of the vehicle body ob, and thus the speaker unit 110 may be exposed to the outside of the vehicle body ob. Meanwhile, when the rotatable cover 130 is in the second state, the hemispherical surface of the rotatable cover 130 may be located inside the vehicle body ob. In this instance, the outside of the vehicle body ob may refer to an interior space of the vehicle 20, and the inside of the vehicle body ob may refer to an inside of center fascia.

The controller 270 may control the driver 180 and/or the light emitter 160 based on an operation mode of the vehicle 20 and/or the speaker device 10.

For example, the controller 270 may control a rotation of the rotatable cover 130 so that the rotatable cover 130 is switched to the first state or the second state.

Figure 6:
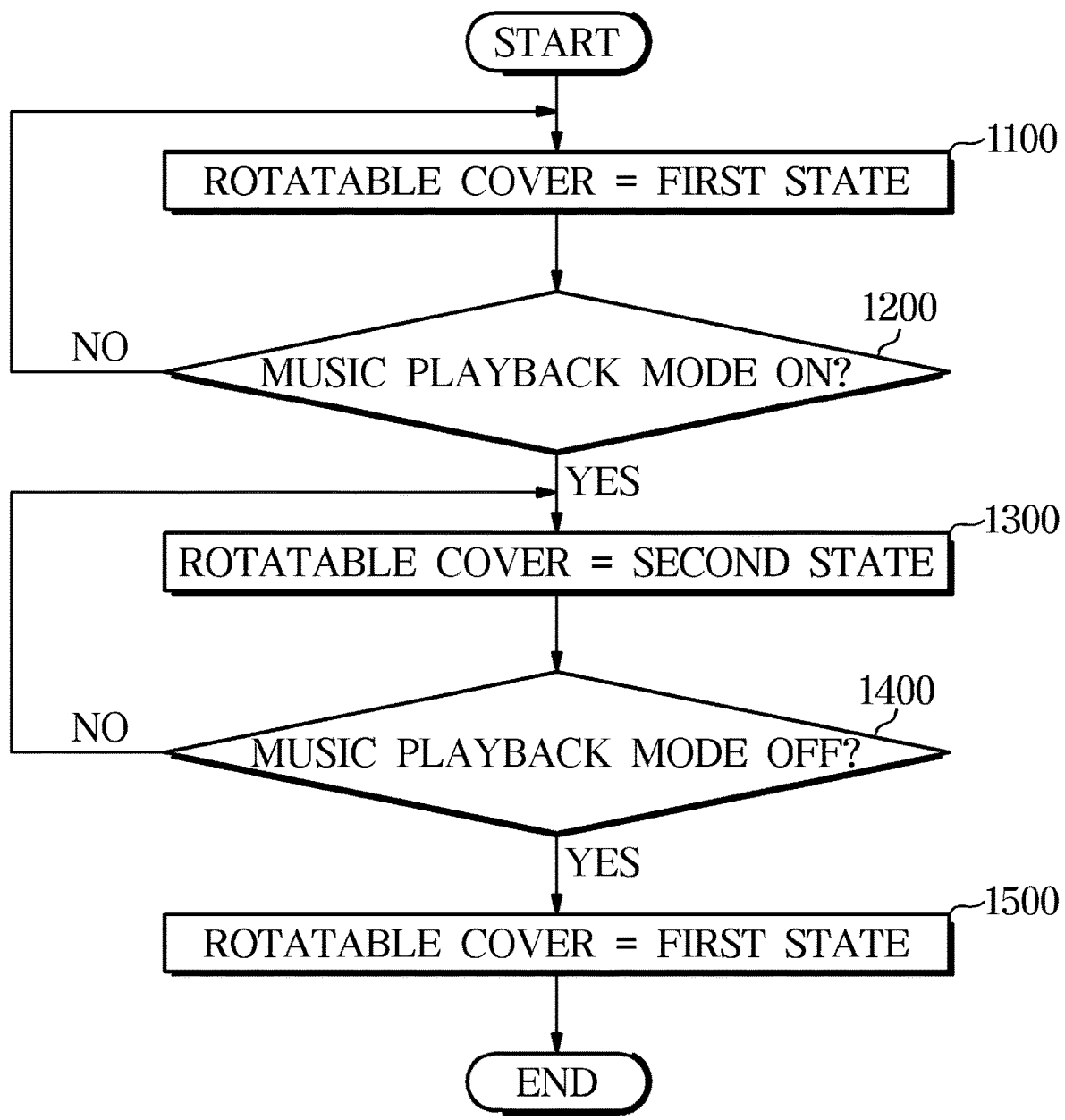
FIG. 6 illustrates a control method of a speaker device or a control method of a vehicle according to an embodiment of the present disclosure.

FIG. 6 illustrates a control method of a speaker device or a control method of a vehicle according to an embodiment of the present disclosure.

With respect to a control method of the speaker device 10, referring to FIG. 6, when a music playback mode is not on in the speaker device 10, the rotatable cover 130 may be in the first state (1100).

For example, in a state where the speaker device 10 is turned off, the rotatable cover 130 may be in the first state. Also, even though the speaker device 10 is turned on, when the music playback mode of the speaker device 10 is not on, the rotatable cover 130 may be in the first state.

Based on the music playback mode being turned on in the speaker device 10 (Yes in operation 1200), the controller 170 may switch the rotatable cover 130 to the second state (1300).

For example, the controller 170 controls the driver 180 to rotate the rotatable cover 130 to the second state from the first state, thereby switching the rotatable cover 130 to the second state.

As described above, a state in which the speaker device 10 operates in the music playback mode may include a state in which the speaker device 10 is turned on, a state in which a source signal is input from the source inputter 190, and/or a state in which a Bluetooth terminal is connected, and the like.

In an embodiment, the controller 170 may switch the rotatable cover 130 to the second state from the first state, based on the speaker device 10 being turned on.

In an embodiment, the controller 170 may switch the rotatable cover 130 to the second state from the first state, based on a source signal being input from the source inputter 190.

In an embodiment, the controller 170 may switch the rotatable cover 130 to the second state from the first state, based on establishment of communication between the speaker device 10 and a Bluetooth terminal.

The controller 170 may switch the rotatable cover 130 to the first state from the second state (1500), based on the music playback mode of the speaker device 10 being turned off (Yes in operation 1400).

For example, the controller 170 controls the driver 180 to rotate the rotatable cover 130 to the first state from the second state, thereby switching the rotatable cover 130 to the first state from the second state.

In an embodiment, the controller 170 may switch the rotatable cover 130 to the first state from the second state, based on an ignition of the vehicle 20 being turned off.

In an embodiment, the controller 170 may switch the rotatable cover 130 to the first state from the second state, based on a source signal no longer input from the source inputter 190.

In an embodiment, the controller 170 may switch the rotatable cover 130 to the first state from the second state, based on disconnection of communication between the speaker device 10 and a Bluetooth terminal.

According to the disclosure, the speaker unit 110 may be externally exposed only when the speaker unit 110 is required to be exposed to an outside of an object ob, thereby preventing a foreign material from entering into the speaker unit 110.

Also, according to the disclosure, the speaker unit 110 may be externally exposed only when the speaker device 10 is playing music or is about to play music, thereby preventing a foreign material from entering into the speaker unit 110.

Further, according to the disclosure, when the speaker device 10 is not playing music or is not about to play music, the hemispherical rotatable cover 130 is externally exposed, thereby improving an aesthetic appeal of the speaker device 10.

With respect to a control method of the vehicle 20, referring to FIG. 6, when a music playback mode of the vehicle 20 is not on, the rotatable cover 130 may be in the first state (1100).

For example, in a state where an ignition of the vehicle 20 is turned off, the rotatable cover 130 may be in the first state. Also, even though the ignition of the vehicle 20 is turned on, when the vehicle 20 is not in the music playback mode, the rotatable cover 130 may be in the first state.

The controller 270 may switch the rotatable cover 130 to the second state (1300), based on the music playback mode being turned on (Yes in operation 1200).

For example, the controller 270 controls the driver 180 to rotate the rotatable cover 130 to the second state from the first state, thereby switching the rotatable cover 130 to the second state.

As described above, a state in which the vehicle 20 operates in the music playback mode may include a state where the music playback mode is in operation based on receiving an execution command for the music playback mode through the user interface 280.

In an embodiment, the controller 270 may switch the rotatable cover 130 to the second state from the first state, based on an ignition of the vehicle 20 being turned on.

In an embodiment, the controller 270 may switch the rotatable cover 130 to the second state from the first state, based on a USB music playback mode being activated.

In an embodiment, the controller 270 may switch the rotatable cover 130 to the second state from the first state, based on a radio playback mode being activated.

In an embodiment, the controller 270 may switch the rotatable cover 130 to the second state from the first state, based on a wireless music playback mode being activated.

In an embodiment, the controller 270 may switch the rotatable cover 130 to the second state from the first state, based on a source signal being input from the source inputter 290.

In an embodiment, the controller 270 may switch the rotatable cover 130 to the second state from the first state, based on establishment of communication between the vehicle 20 and a Bluetooth terminal in the wireless music playback mode.

The controller 270 may switch the rotatable cover 130 to the first state from the second state (1500), based on the music playback mode being turned off (Yes in operation 1400).

For example, the controller 270 controls the driver 180 to rotate the rotatable cover 130 to the first state from the second state, thereby switching the rotatable cover 130 to the first state.

In an embodiment, the controller 270 may switch the rotatable cover 130 to the first state from the second state, based on the ignition of the vehicle 20 being turned off.

In an embodiment, the controller 270 may switch the rotatable cover 130 to the first state from the second state, based on the music playback mode being turned off.

In an embodiment, the controller 270 may switch the rotatable cover 130 to the first state from the second state, based on a source signal no longer input from the source inputter 290.

In an embodiment, the controller 270 may switch the rotatable cover 130 to the first state from the second state, based on disconnection of communication between the vehicle 20 and a Bluetooth terminal in the wireless music playback mode.

According to the disclosure, the speaker unit 110 of the speaker device 10 provided in the vehicle 20 may be exposed to the outside of the vehicle body ob, only when the speaker unit 110 is required to be externally exposed, thereby preventing a foreign material from entering into the speaker unit 110.

Also, according to the disclosure, the speaker unit 110 may be exposed to the outside of the vehicle body ob, only when the speaker device 10 provided in the vehicle 20 is playing music or is about to play music, thereby preventing a foreign material from entering into the speaker unit 110.

Further, according to the disclosure, when the speaker device 10 provided in the vehicle 20 is not playing music or is not about to play music, the hemispherical rotatable cover 130 is exposed to the outside of the vehicle body ob, thereby improving an aesthetic appeal of the vehicle 20.

In an embodiment, the controller 170 may control the light emitter 160 to emit light, based on a preset condition being satisfied.

For example, the controller 170 may control the light emitter 160 to emit light, based on the speaker device 10 being turned on.

As another example, the controller 170 may control the light emitter 160 to emit light, when the speaker device 10 is not operated in the music playback mode.

As still another example, the controller 170 may control the light emitter 160 to emit light, when the speaker device 10 is operated in the music playback mode.

As yet another example, the controller 170 may control the light emitter 160 to emit light, when the rotatable cover 130 is in the second state.

As further example, the controller 170 may control the light emitter 160 to emit light, when the rotatable cover 130 is in the first state.

In an embodiment, the controller 270 may control the light emitter 160 to emit light, based on a preset condition being satisfied.

For example, the controller 270 may control the light emitter 160 to emit light, based on an ignition of the vehicle 20 being turned on.

As another example, the controller 270 may control the light emitter 160 to emit light, when the vehicle 20 is not operated in the music playback mode.

As still another example, the controller 270 may control the light emitter 160 to emit light, when the vehicle 20 is operated in the music playback mode.

As yet another example, the controller 270 may control the light emitter 160 to emit light, when the rotatable cover 130 is in the second state.

As further example, the controller 270 may control the light emitter 160 to emit light, when the rotatable cover 130 is in the first state.

According to the disclosure, the light emitter 160 emits light towards the rotatable cover 130, thereby improving an aesthetic appeal of the speaker device 10.

Also, according to the disclosure, the light emitter 160 emits light towards the rotatable cover 130, thereby creating an internal atmosphere of the vehicle 20.

Figure 7:
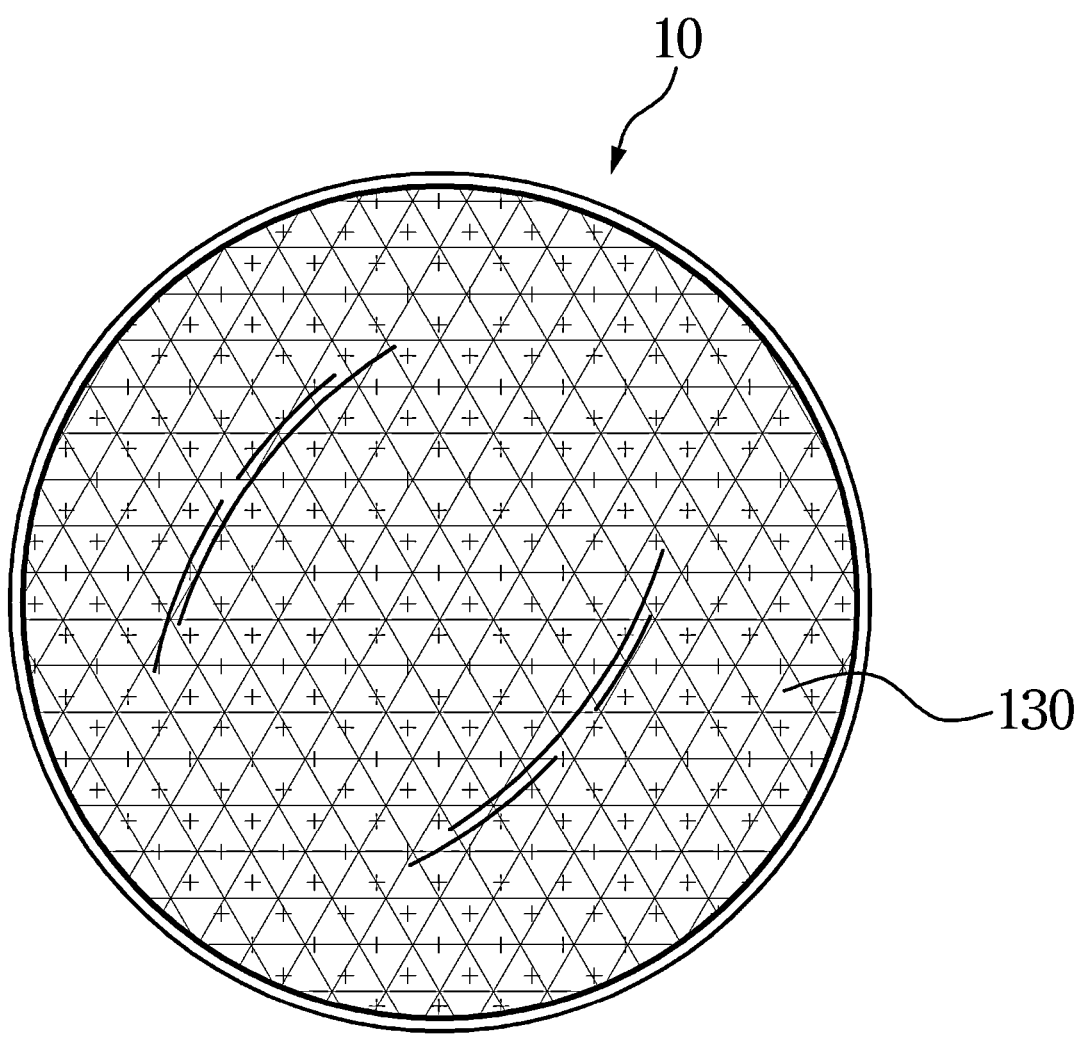
FIG. 7 illustrates an example of a speaker device viewed by a vehicle occupant, when a rotatable cover is in a first state according to an embodiment of the present disclosure.

FIG. 7 illustrates an example of a speaker device viewed by a vehicle occupant, when a rotatable cover is in a first state according to an embodiment of the present disclosure.

Referring to FIG. 7, when the rotatable cover 130 is in the first state, a hemispherical surface of the rotatable cover 130 may be exposed to an outside of a vehicle body ob. The externally exposed hemispherical surface is in convex form and may shield the speaker unit 110.

The rotatable cover 130 may be made of various materials such as glass, crystal, acrylic, and the like, to improve an aesthetic appeal of interior of the vehicle 20.

Also, when the light emitter 160 emits light towards the rotatable cover 130, an aesthetic appeal of interior of the vehicle 20 may be further improved.

Figure 8:
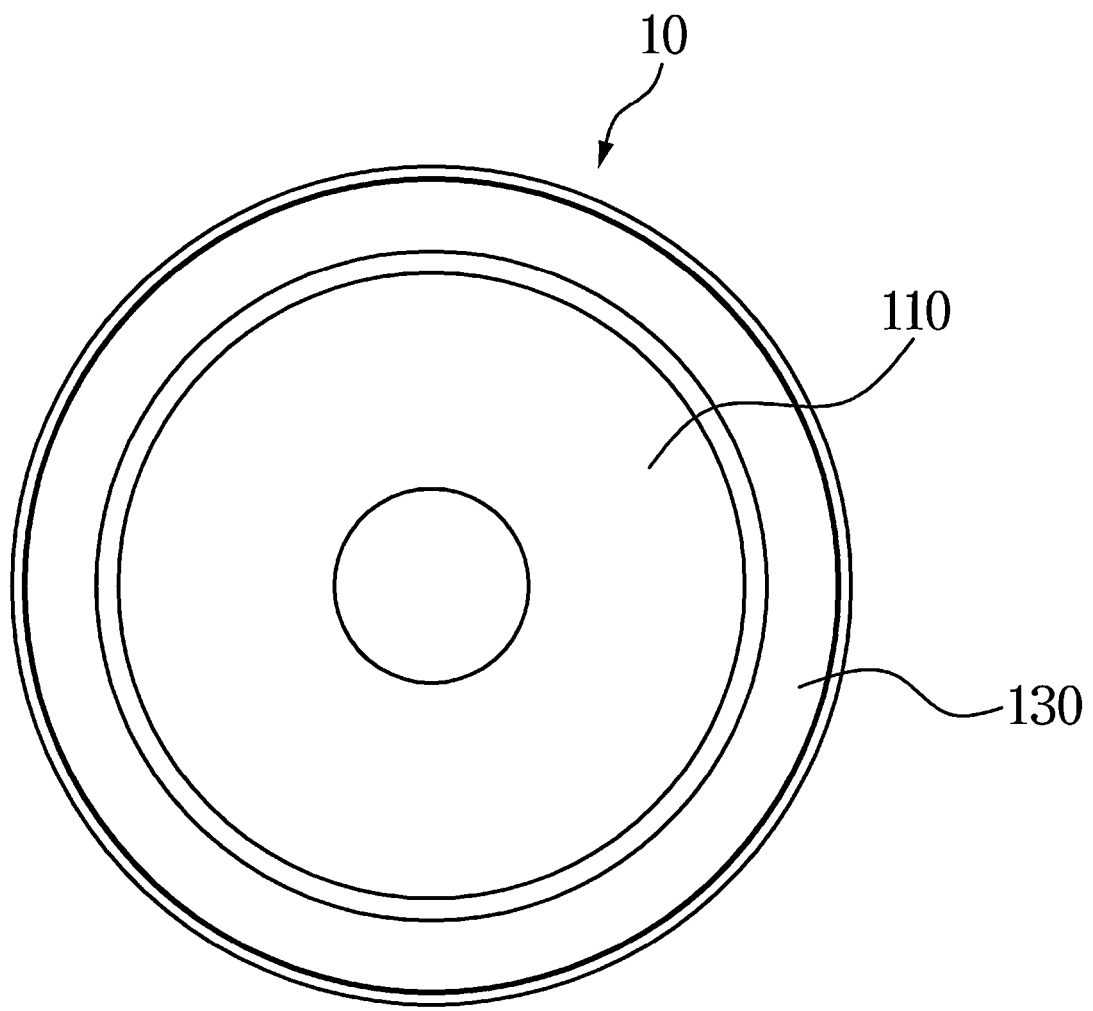
FIG. 8 illustrates an example of a speaker device viewed by a vehicle occupant, when a rotatable cover is in a second state according to an embodiment of the present disclosure.

FIG. 8 illustrates an example of a speaker device viewed by a vehicle occupant, when a rotatable cover is in a second state according to an embodiment of the present disclosure.

Referring to FIG. 8, when the rotatable cover 130 is in the second state, a hemispherical surface of the rotatable cover 130 may be inserted into an inside of vehicle body ob, and the speaker unit 110 may be exposed to an outside of the vehicle body ob.

When the speaker unit 110 is exposed to the outside of the vehicle body ob, a sound output through the speaker unit 110 may be delivered to a user more clearly.

Meanwhile, when the rotatable cover 130 is in the second state and the light emitter 160 emits light, light may leak through a gap between the rotatable cover 130 and the speaker unit 110. Accordingly, even when the rotatable cover 130 is in the second state, an aesthetic appeal of the speaker device 10 may be improved.

Figure 9:
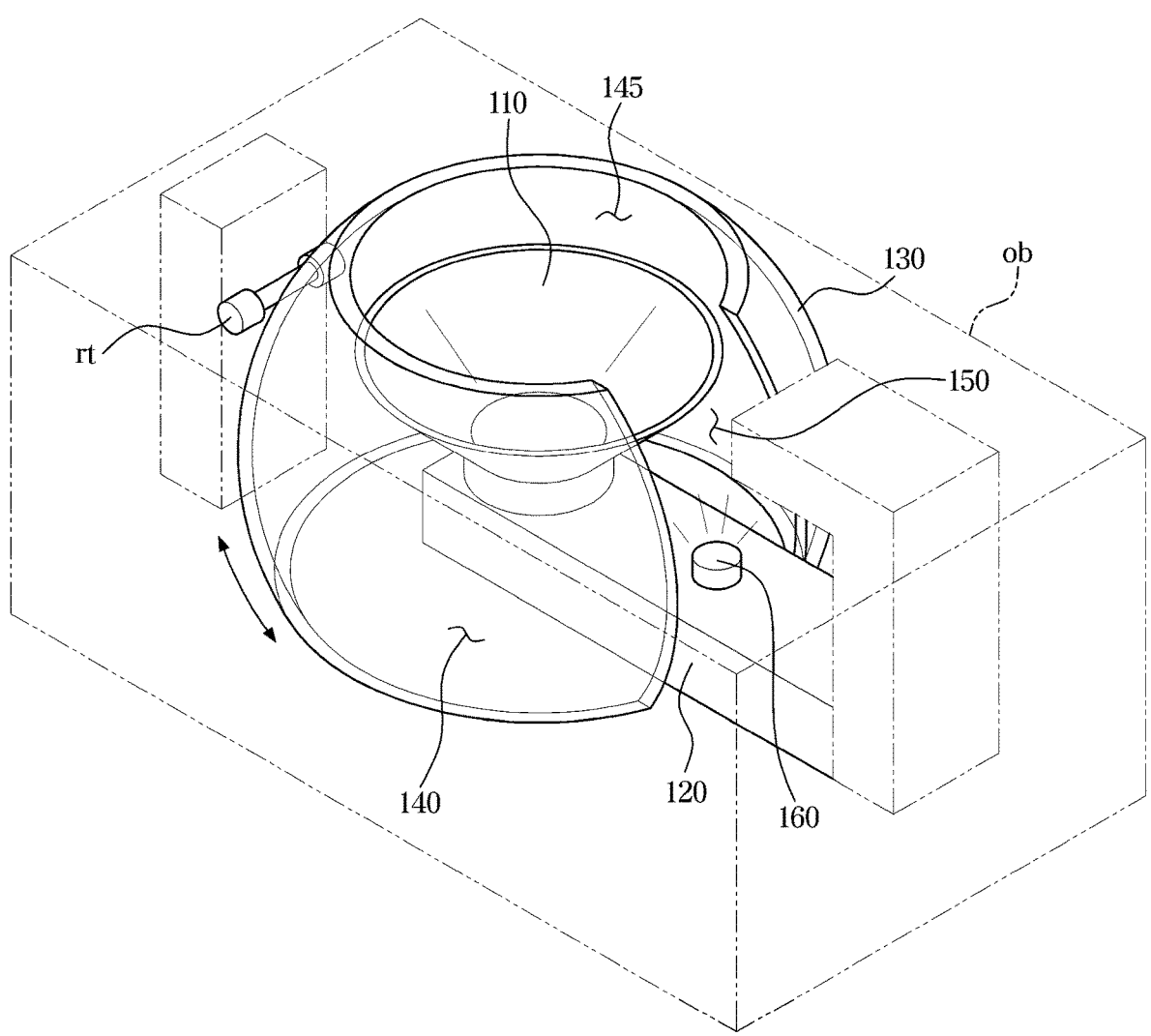
FIG. 9 is a perspective view illustrating a speaker device when a rotatable cover is in a third state according to an embodiment of the present disclosure.
Figure 10:
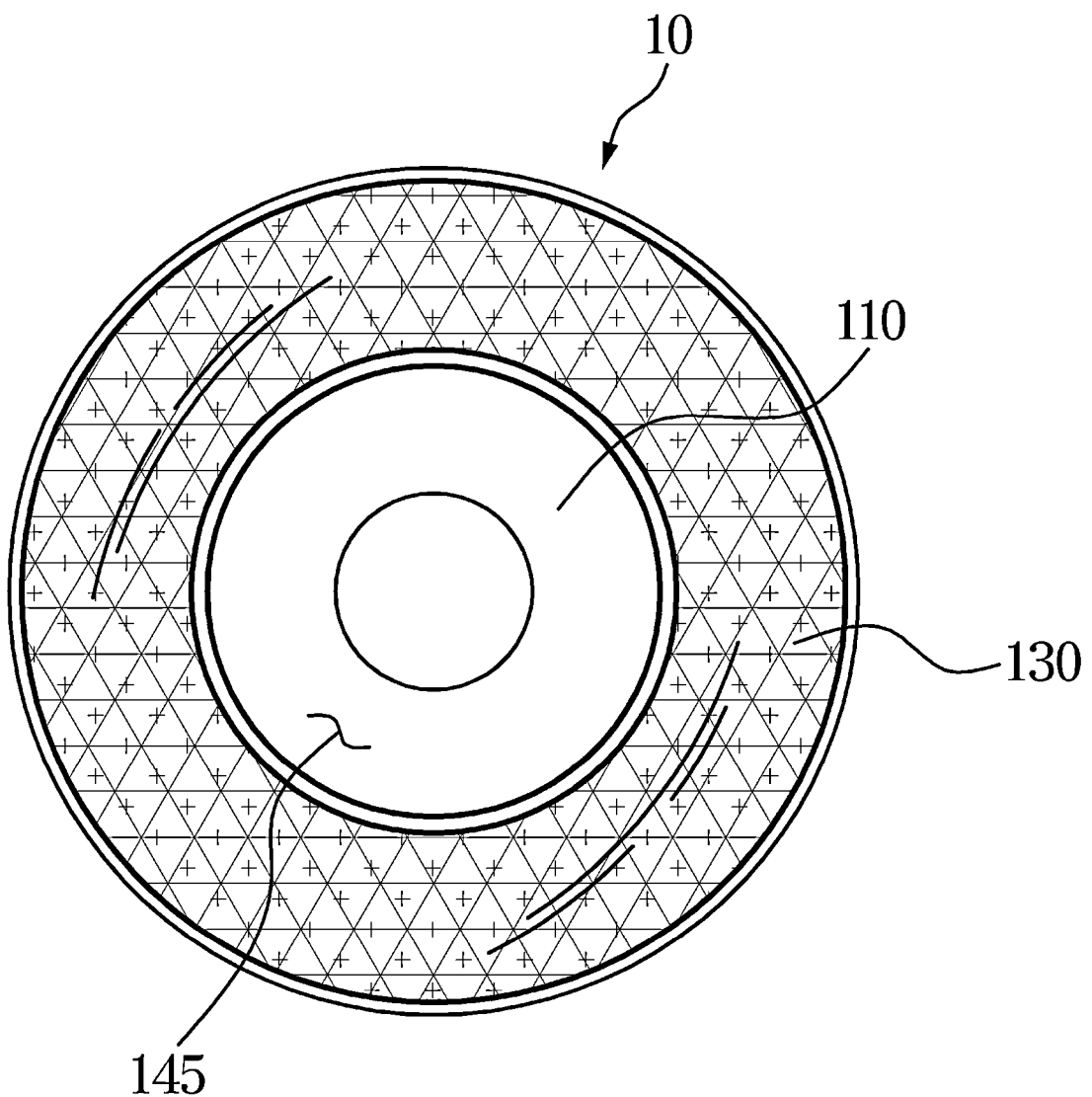
FIG. 10 illustrates an example of a speaker device viewed by a vehicle occupant, when a rotatable cover is in a third state according to an embodiment of the present disclosure.

FIG. 9 is a perspective view illustrating a speaker device when a rotatable cover is in a third state according to an embodiment of the present disclosure. FIG. 10 illustrates an example of a speaker device viewed by a vehicle occupant when a rotatable cover is in a third state according to an embodiment of the present disclosure.

Referring to FIGS. 9 and 10, according to various embodiments, the speaker device 10 may include a rotatable cover 130 where at least two openings 140 and 145 are formed.

For example, the rotatable cover 130 may have a spherical shell shape, and include the first opening 140, the second opening 145 and a slit 150.

When the rotatable cover 130 includes the first opening 140 and the second opening 145, the rotatable cover 130 is rotatable to a state (hereinafter, a 'first state') where the rotatable cover 130 entirely shields the speaker unit 110 from an outside of an object ob, to a state (hereinafter, a 'second state') where the speaker unit 110 is entirely exposed to the outside of the object ob, or to a state (hereinafter, a 'third state') where the speaker unit 110 is partially exposed to the outside of the object ob.

The first opening 140 and the second opening 145 may be connected to each other via the slit 150.

Accordingly, while the rotatable cover 130 rotates from the first state to the second state or the third state, the slit 150 may function as a passage for preventing the rotatable cover 130 from colliding with the fixing member 120.

While the rotatable cover 130 rotates from the second state to the third state, the slit 150 may also function as a passage for preventing the rotatable cover 130 from colliding with the fixing member 120.

For example, the slit 150 may be formed by partially cutting a spherical surface of the rotatable cover 130.

The slit 150 may be formed by partially cutting the spherical surface in a rotational direction of the rotatable cover 130, and may have a larger width than the fixing member 120.

Accordingly, while the rotatable cover 130 rotates from the first state to the second state or the third state, the fixing member 120 may not collide with the rotatable cover 130.

The first opening 140 may entirely expose the speaker unit 110 to the outside of the object ob in the second state. When the speaker device 10 is installed in the vehicle 20, the first opening 140 may entirely expose the speaker unit 110 to the outside of a vehicle body ob in the second state.

The second opening 145 may partially expose the speaker unit 110 to the outside of the object ob in the third state. When the speaker device 10 is installed in the vehicle 20, the second opening 145 may partially expose the speaker unit 110 to the outside of the vehicle body ob in the third state.

Each of the first opening 140 and the second opening 145 may be formed by cutting the spherical shell shape by a single plane. That is, each of the first opening 140 and the second opening 145 in a circular shape may be formed when a spherical cap is cut from the spherical shell shape.

A diameter of the first opening 140 may be larger than that of the speaker unit 110, and a diameter of the second opening 145 may be smaller than that of the speaker unit 110.

That is, the first opening 140 may have a larger diameter than the second opening 145.

Accordingly, only a part of the speaker unit 110 may be exposed to the outside of the object ob in the third state.

Referring to FIG. 10, when the rotatable cover 130 is in the third state, it may be confirmed that the only a part of the speaker unit 110 is exposed to the outside of the object ob. Accordingly, a portion of the rotatable cover 130 is also exposed to the outside of the object ob.

The rotatable cover 130 exposed to the outside of the object ob in the third state may have a shape obtained when a spherical cap is cut from the spherical shell.

According to various embodiments, the controller 170 or 270 may control a rotation of the rotatable cover 130 so that the rotatable cover 130 is switched to the first state, the second state or the third state.

In an embodiment, the controller 170 or 270 may switch the rotatable cover 130 to the second state in a music playback mode, switch the rotatable cover 130 to the third state in a navigation voice playback mode, and switch the rotatable cover 130 to the first state in other modes.

When a navigation function of the vehicle 20 is operated in a state where the speaker device 10 or the vehicle 20 is not switched to the music playback mode, the speaker device 10 or the vehicle 20 may be operated in the navigation voice playback mode.

In the navigation voice playback mode, a source device may be a navigation device, and a source signal may be a navigation guidance voice signal.

Even when a sound quality of navigation voice is slightly lower than that of music, a driver does not feel uncomfortable.

According to the disclosure, in the navigation voice playback mode, both a portion of the speaker unit 110 and a portion of the rotatable cover 130 are exposed to the outside of the object ob, thereby securing a sound quality and aesthetic appeal.

Meanwhile, when the rotatable cover 130 is in the third state, the controller 170 or 270 may control the light emitter 160 to emit light. Accordingly, light is emitted to the partially exposed rotatable cover 130, thereby improving an aesthetic appeal of interior of the vehicle 20.

In the meantime, a user of the vehicle 20 may desire to use the speaker device 10 as lighting, not as a speaker. Because a plurality of speaker devices other than the speaker device 10 according to an embodiment are installed in the vehicle 20, a sound quality in the vehicle 20 is not significantly affected even when the speaker device 10 according to an embodiment is not used as a sound output means.

According to various embodiments, the user interface 280 may provide a user interface for setting a function of the speaker device 10 installed in the vehicle 20.

For example, the user interface for setting a function of the speaker device 10 may include an element for turning on/off a lighting mode of the speaker device 10, an element for turning on/off a music output mode of the speaker device 10, and an element for setting a condition for switching the rotatable cover 130 to the second state or the third state from the first state.

The controller 270 may control the speaker device 10 based on a user input through the user interface 280.

For example, based on receiving a user input for turning on the lighting mode of the speaker device 10, the controller 270 may control the rotatable cover 130 to maintain the first state and control the light emitter 160 to emit light.

As another example, based on receiving a user input for turning on the music output mode of the speaker device 10, the controller 270 may control the rotatable cover 130 to maintain the second state.

Meanwhile, when both the lighting mode and the music output mode are turned off, the controller 270 may control the driver 180 and/or the light emitter 160 according to the above-described control method.

Through the element for setting a condition for switching the rotatable cover 130 to the second state or the third state from the first state, a user may set a rotation condition of the rotatable cover 130.

The rotation condition of the rotatable cover 130 may include various conditions such as when an ignition of the vehicle 20 is turned on, when a music playback mode is in operation, when a navigation voice playback mode is in operation, when a source signal is input from the source inputter 290, when communication between a Bluetooth terminal and the vehicle 20 is established, and the like.

For example, as the rotation condition of the rotatable cover 130, when a user only selects a condition that communication between a Bluetooth terminal and the vehicle 20 is established without selecting other conditions, the controller 270 may switch the rotatable cover 130 to the second state from the first state, only when the communication between the Bluetooth terminal and the vehicle 20 is established.

According to the disclosure, the rotation condition of the rotatable cover 130 may be set according to a user's request, thereby improving a user satisfaction.

Also, when a user desires to use the speaker device 10 as lighting, the speaker device 10 may be used as lighting at any time.

As is apparent from the above, according to the disclosure, in terms of design, marketability of the speaker device can be improved.

According to the disclosure, a user can easily recognize an operation state of the speaker device.

According to the disclosure, an influx of foreign materials to the speaker unit can be prevented.

According to the disclosure, an aesthetic appeal of a vehicle interior can be improved.

According to the disclosure, a vehicle occupant can easily recognize an operation state of the speaker device.

According to the disclosure, a failure of the speaker device provided in the vehicle can be prevented in advance.

Meanwhile, embodiments of the speaker device, the vehicle including the same, and the control method of the vehicle can be stored in the form of a recording medium storing computer-executable instructions. The instructions may be stored in the form of a program code, and when executed by a processor, the instructions may perform operations of the disclosed embodiments. The recording medium may be implemented as a computer-readable medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A speaker device, comprising:
   a speaker unit;
   a fixing member configured to fix the speaker unit to an object;
   a rotatable cover configured to be rotatable to a first state where the rotatable cover shields the speaker unit from an outside of the object, or to a second state where the speaker unit is exposed to the outside of the object; and
   a controller configured to control a rotation of the rotatable cover to switch the rotatable cover to the first state or the second state,
   wherein the rotatable cover has a spherical shell form, and comprises:
      a slit configured to prevent the rotatable cover from colliding with the fixing member while the rotatable cover rotates from the first state to the second state; and
      an opening configured to expose the speaker unit to the outside of the object in the second state.

2. The speaker device of claim 1, wherein the rotatable cover has a hemispherical surface exposed to the outside of the object in the first state.

3. The speaker device of claim 1, wherein the controller is configured to switch the rotatable cover to the second state based on a music playback mode being on, and switch the rotatable cover to the first state based on the music playback mode being off.

4. The speaker device of claim 1, further comprising:
   a light emitter configured to emit light towards the rotatable cover.

5. The speaker device of claim 4, wherein the light emitter is on the fixing member.

6. A speaker device, comprising:
   a speaker unit;
   a fixing member configured to fix the speaker unit to an object;
   a rotatable cover configured to be rotatable to a first state where the rotatable cover shields the speaker unit from an outside of the object, or to a second state where the speaker unit is exposed to the outside of the object; and
   a controller configured to control a rotation of the rotatable cover to switch the rotatable cover to the first state or the second state,
   wherein the rotatable cover is configured to entirely expose the speaker unit to the outside of the object in the second state, and partially expose the speaker unit to the outside of the object in a third state,
   the controller is further configured to control the rotation of the rotatable cover to switch the rotatable cover to the first state, the second state or the third state, and
   the rotatable cover comprises:
      a slit configured to prevent the rotatable cover from colliding with the fixing member while the rotatable cover rotates from the first state to the second state or the third state;
      a first opening configured to entirely expose the speaker unit to the outside of the object in the second state; and
      a second opening configured to partially expose the speaker unit to the outside of the object in the third state.

7. The speaker device of claim 6, wherein a size of the first opening is larger than a size the second opening.

8. The speaker device of claim 7, wherein the controller is configured to switch the rotatable cover to the second state in a music playback mode, switch the rotatable cover to the third state in a navigation voice playback mode, and switch the rotatable cover to the first state in other modes.

9. A vehicle, comprising:
   a speaker unit;
   a fixing member configured to fix the speaker unit to a vehicle body;
   a rotatable cover configured to be rotatable to a first state where the rotatable cover shields the speaker unit from an outside of the vehicle body, or to a second state where the speaker unit is exposed to the outside of the vehicle body; and
   a controller configured to control a rotation of the rotatable cover to switch the rotatable cover to the first state or the second state,
   wherein the rotatable cover has a spherical shell form, and comprises:
      a slit configured to prevent the rotatable cover from colliding with the fixing member while the rotatable cover rotates from the first state to the second state; and
      an opening configured to expose the speaker unit to the outside of the object in the second state.

10. The vehicle of claim 9, wherein the rotatable cover has a hemispherical surface exposed to the outside of the vehicle body in the first state.

11. The vehicle of claim 9, wherein the controller is configured to switch the rotatable cover to the second state based on a music playback mode being on, and switch the rotatable cover to the first state based on the music playback mode being off.

12. The vehicle of claim 9, further comprising:
   a light emitter configured to emit light towards the rotatable cover.

13. The vehicle of claim 12, wherein the light emitter is on the fixing member.

14. A vehicle, comprising:
   a speaker unit;
   a fixing member configured to fix the speaker unit to a vehicle body;
   a rotatable cover configured to be rotatable to a first state where the rotatable cover shields the speaker unit from an outside of the vehicle body, or to a second state where the speaker unit is exposed to the outside of the vehicle body; and
   a controller configured to control a rotation of the rotatable cover to switch the rotatable cover to the first state or the second state,
   wherein the rotatable cover is configured to entirely expose the speaker unit to the outside of the vehicle body in the second state, and partially expose the speaker unit to the outside of the vehicle body in a third state,
   the controller is further configured to control the rotation of the rotatable cover to switch the rotatable cover to the first state, the second state or the third state, and
   the rotatable cover comprises:
      a slit configured to prevent the rotatable cover from colliding with the fixing member while the rotatable cover rotates from the first state to the second state or the third state;
      a first opening configured to entirely expose the speaker unit to the outside of the vehicle body in the second state; and a second opening configured to partially expose the speaker unit to the outside of the vehicle body in the third state.

15. The vehicle of claim 14, wherein a size of the first opening is larger than a size of the second opening.

16. The vehicle of claim 14, wherein the controller is configured to switch the rotatable cover to the second state in a music playback mode, switch the rotatable cover to the third state in a navigation voice playback mode, and switch the rotatable cover to the first state in other modes.

* * * * *